United States Patent
Schumacher et al.

(10) Patent No.: US 6,543,011 B1
(45) Date of Patent: Apr. 1, 2003

(54) METHOD FOR EVENT RECORDING IN JAVA

(75) Inventors: Daniel Mark Schumacher, Austin, TX (US); Thomas James Watson, Austin, TX (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 09/353,949

(22) Filed: Jul. 15, 1999

(51) Int. Cl.$^7$ ................................................ H02H 3/05
(52) U.S. Cl. ........................... 714/45; 709/217; 345/744
(58) Field of Search .......................... 714/45; 717/148; 707/513, 101; 709/203, 217, 227; 345/744

(56) References Cited

U.S. PATENT DOCUMENTS

| | | | | |
|---|---|---|---|---|
| 5,694,540 A | * | 12/1997 | Humelsine et al. | 714/33 |
| 5,712,972 A | * | 1/1998 | Kakkar | 714/26 |
| 5,847,957 A | * | 12/1998 | Cohen et al. | 364/468.15 |
| 6,018,343 A | * | 1/2000 | Wang et al. | 345/356 |
| 6,125,402 A | * | 9/2000 | Nagarajayya et al. | 709/304 |
| 6,282,702 B1 | * | 8/2001 | Ungar | 717/5 |
| 6,336,118 B1 | * | 1/2002 | Hammond | 707/103 |

OTHER PUBLICATIONS

Presenting Java Beans; Morrison, Michael; 1997, Sams.net publishing, First Edition, pp. 16, 29, 42–43, 84–85, 89–90.*
The Java Developers Almanac 1998; Chan, Patrick ; 1998, Addison Wesley Longman, Inc., pp. 178–179, 349–350.*

* cited by examiner

Primary Examiner—Robert Beausoliel
Assistant Examiner—Rita A Ziemer
(74) Attorney, Agent, or Firm—Duke W. Yee; John D. Flynn; Stephen J. Walder, Jr.

(57) ABSTRACT

A method for recording events in Java. According to a preferred embodiment, an automator is attached to a Java applet. Responsive to selection by a user, listeners are added for each event type produced in the Java applet. Each time a specified event occurs, that event is captured and saved to a data structure. The recording of events is performed until the user stops the process.

31 Claims, 5 Drawing Sheets

METHOD FOR EVENT RECORDING IN JAVA

BACKGROUND OF THE INVENTION

1. Technical Field

The present invention relates generally to computer software and, more specifically, to methods of recording events in Java.

2. Description of Related Art

The evolution of programming languages has, to a great extent, been driven by changes in the hardware being programmed. As hardware has grown faster, cheaper, and more powerful, software has become larger and more complex. The migration from assembly languages to procedural languages, such as C, and to object-oriented languages, such as C++ and Java, was largely driven by a need to manage ever greater complexity—complexity made possible by increasingly powerful hardware.

Today, the progression toward cheaper, faster, and more powerful hardware continues, as does the need for managing increasing software complexity. Building on C and C++, Java helps programmers deal with complexity by rendering impossible certain kinds of bugs that frequently plague C and C++ programmers.

In addition to the increasing capabilities of hardware, there is another fundamental shift taking place that impacts upon software programming, that is the network. As networks interconnect more and more computers and devices, new demands are being placed on software. One of these demands is platform independence.

Java supports platform independence primarily through the creation of the Java Virtual Machine. The Java Virtual Machine is an abstract computer, and its specification defines certain features every Java Virtual Machine must have. However, the specification for the Java Virtual Machine is flexible, enabling it to be implemented on a wide variety of computers, devices, and operating systems. One of the main tasks performed by a Java Virtual Machine is to load class files and execute the bytecodes they contain.

One type of program executed by a Java Virtual Machine is an applet. An applet is a Java program that has a set of standard properties that are defined by the applet class. This class was developed by Sun Microsystems and is included in the standard Java Software Development Kit (Java SDK).

Although, theoretically, a program written in Java for one platform should perform on any Java enabled platform, given the allowable differences among Java platform implementations and other factors, a Java program or applet should be tested on all platforms on which it is anticipated to perform. Since user actions in Java are handled by events, and since it can sometimes take many hours or days for a problem to manifest itself, testing of the entire Java Virtual Machine on a platform can be very tedious. Therefore, it is desirable to provide methods of automating the functional testing of the Java platform on various systems.

However, current methods of automating testing of the Java platform on various systems requires a specialized execution environment, as well as compilation of a separate program. Furthermore, current methods require that the applet or application must be exited before any automation can take place, and they require a significant amount of system resources. Therefore, there is a need for a simpler method of testing the Java platform, that does not require recompilation of code, that does not require the applet or application to be exited before automation, and that uses fewer system resources.

SUMMARY OF THE INVENTION

The present invention provides a data processor implemented method for recording events in Java. According to a preferred embodiment, an automator is attached to a Java applet. Responsive to selection by a user, listeners are added for each event type produced in the Java applet. Each time a specified event occurs, that event is captured and saved to a data structure. The recording of events is performed until the user stops the process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
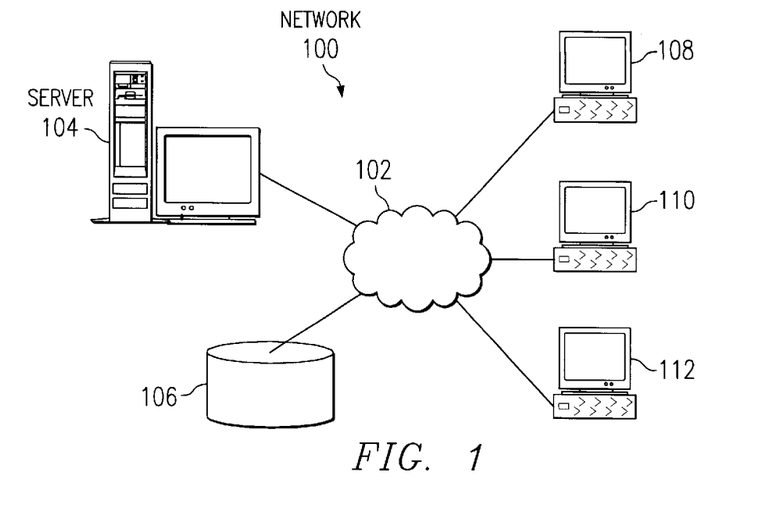
FIG. 1 is a pictorial representation of a distributed data processing system.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network, which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
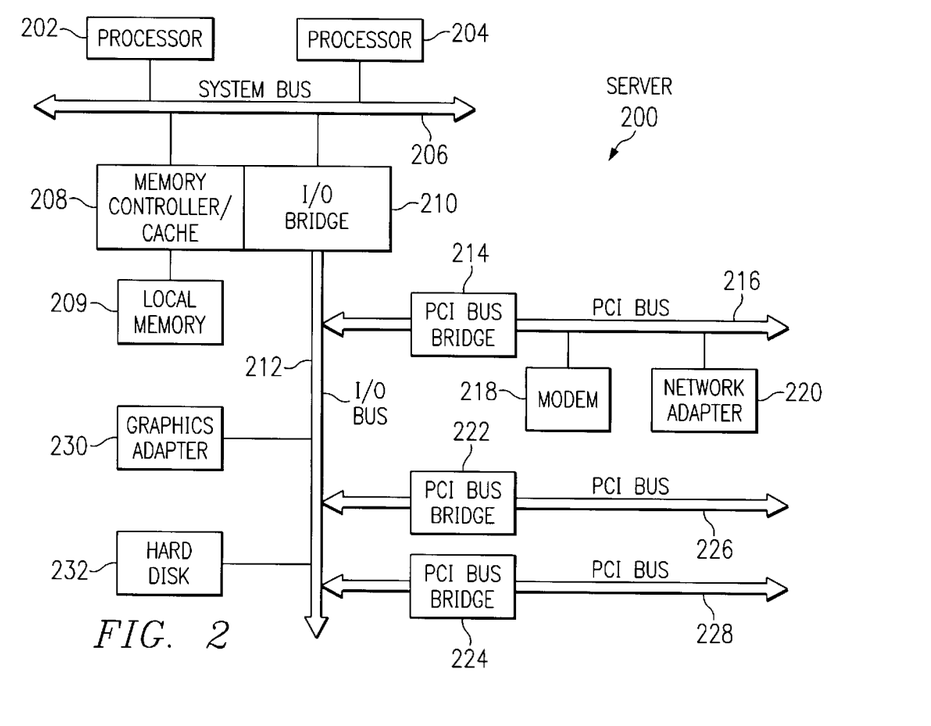
FIG. 2 is a block diagram of a data processing system that may be implemented as a server.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000, a product of International Business Machines Corporation in Armonk, N.Y., running the Advanced Interactive Executive (AIX) operating system.

Figure 3:
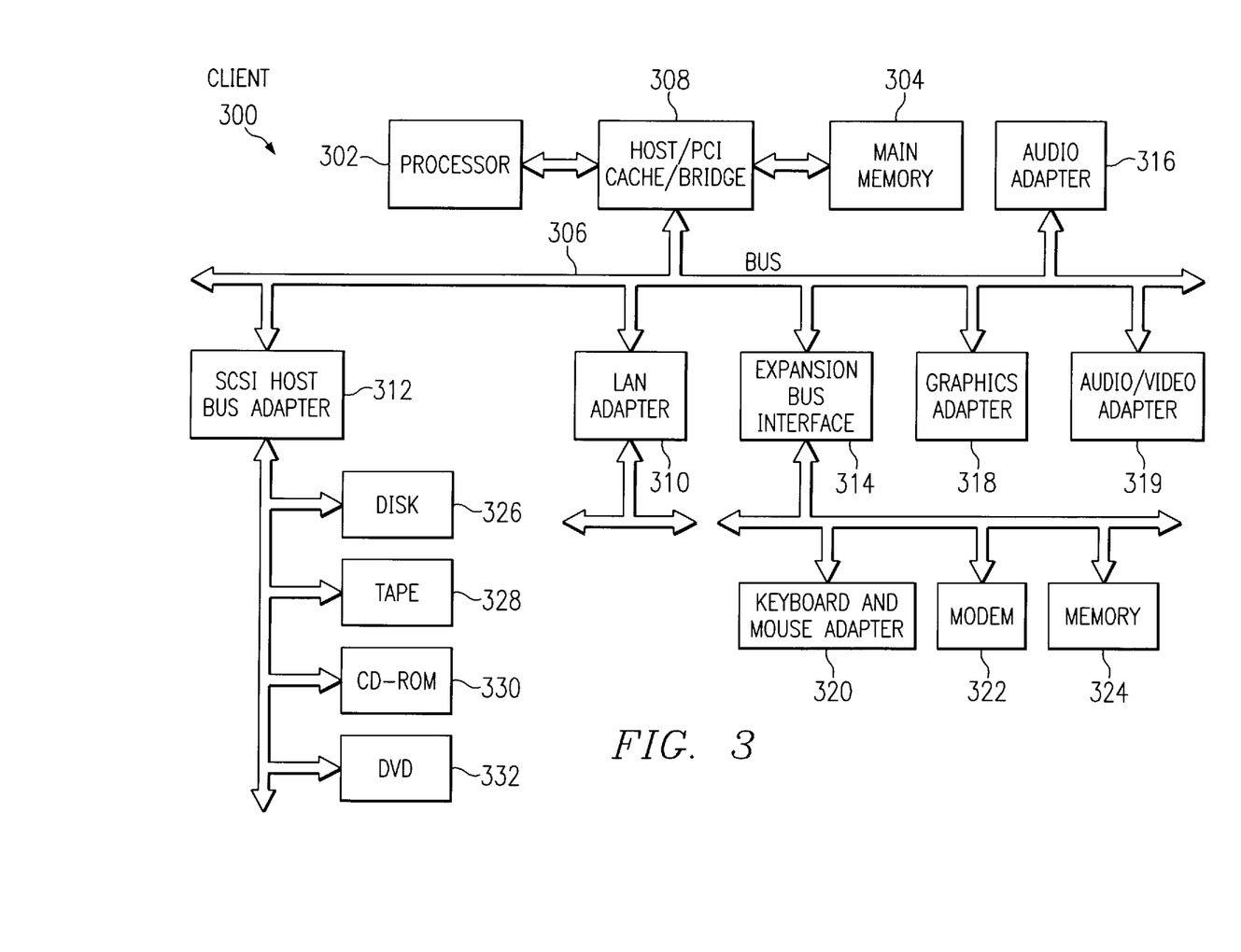
FIG. 3 is a block diagram of a data processing system.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital versatile disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, If; such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
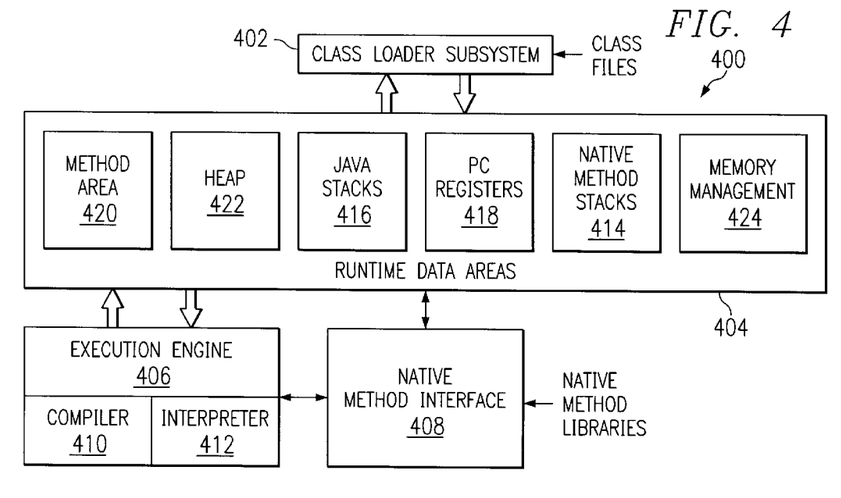
FIG. 4 is a block diagram of a Java virtual machine (JVM)

With reference now to FIG. 4, a block diagram of a Java virtual machine (JVM) is depicted in accordance with a preferred embodiment of the present invention. JVM 400 includes a class loader subsystem 402, which is a mechanism for loading types, such as classes and interfaces, given fully qualified names. JVM 400 also contains runtime data areas 404, execution engine 406, native method interface 408, and memory management 424. Execution engine 406 is a mechanism for executing instructions contained in the methods of classes loaded by class loader subsystem 402. Execution engine 406 may be, for example, Java interpreter 412 or just-in-time compiler 410. Native method interface 408 allows access to resources in the underlying operating system. Native method interface 408 may be, for example, a Java native interface.

Runtime data areas 404 contain native method stacks 414, Java stacks 416, PC registers 418, method area 420, and heap 422. These different data areas represent the organization of memory needed by JVM 400 to execute a program.

Java stacks 416 are used to store the state of Java method invocations. When a new thread is launched, the JVM creates a new Java stack for the thread. The JVM performs only two operations directly on Java stacks; it pushes and pops frames. A thread's Java stack stores the state of Java method invocations for the thread. The state of a Java method invocation includes its local variables, the parameters with which it was invoked, its return value, if any, and intermediate calculations.

Java stacks are composed of stack frames. A stack frame contains the state of a single Java method invocation. When a thread invokes a method, the JVM pushes a new frame onto the Java stack of the thread. When the method completes, the JVM pops the frame for that method and discards it. A JVM does not have any registers for holding intermediate values; any Java instruction that requires or produces an intermediate value uses the stack for holding the intermediate values. In this manner, the Java instruction set is well defined for a variety of platform architectures.

PC registers 418 are used to indicate the next instruction to be executed. Each instantiated thread gets its own PC register (program counter) and Java stack. If the thread is executing a JVM method, the value of the PC register indicates the next instruction to execute. If the thread is executing a native method, then the contents of the PC register are undefined.

Native method stacks 414 store the state of invocations of native methods. The state of native method invocations is stored in an implementation-dependent way in native method stacks, registers, or other implementation-dependent memory areas. In some JVM implementations, native method stacks 414 and Java stacks 416 are combined.

Method area 420 contains class data, while heap 422 contains all instantiated objects. The JVM specification strictly defines data types and operations. Most JVM implementations choose to have one method area and one heap, each of which is shared by all threads running inside the JVM. When the JVM loads a class file, it parses information about a type from the binary data contained in the class file. It places this type information into the method area. Each time a class instance or array is created, the memory for the new object is allocated from heap 422. JVM 400 includes an instruction that allocates memory space within the memory for heap 422 but includes no instruction for freeing that space within the memory. In the depicted example, memory management 424 manages memory space within the memory allocated to heap 422. Memory management 424 may include a garbage collector that automatically reclaims memory used by objects that are no longer referenced by an application. Additionally, a garbage collector also may move objects to reduce heap fragmentation.

Figure 5:
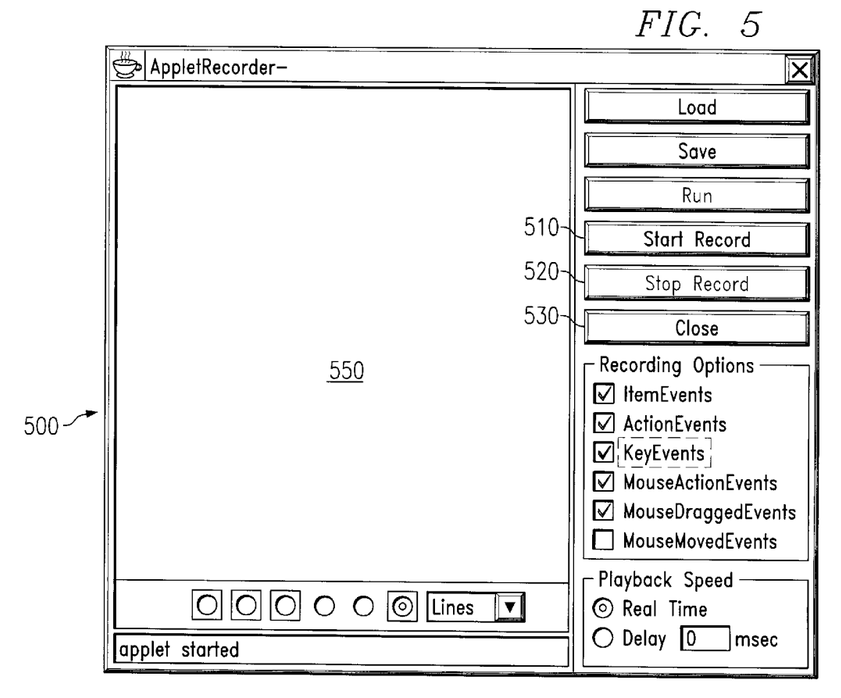
FIG. 5 depicts a sample user interface to an applet recorder.

Turning now to FIG. 5, there is depicted a screen image of user interface 500 for an applet recorder in accordance with the present invention, which may run on top of a JVM such as JVM 400. User interface 500 contains a start record button 510 to start recording events, and a stop record button 520 to stop recording events. User interface 500 also contains a close button 530 to close the applet recorder. The applet is viewed in area 550 on the left side of user interface 500.

The applet is loaded and started prior to receiving a request to record events. Thus, in the embodiment illustrated in FIG. 5, the applet has been loaded and started. Start record button 510 is enabled because recording has not commenced. Stop record button 520 is not enabled, for the same reason.

Figure 6:
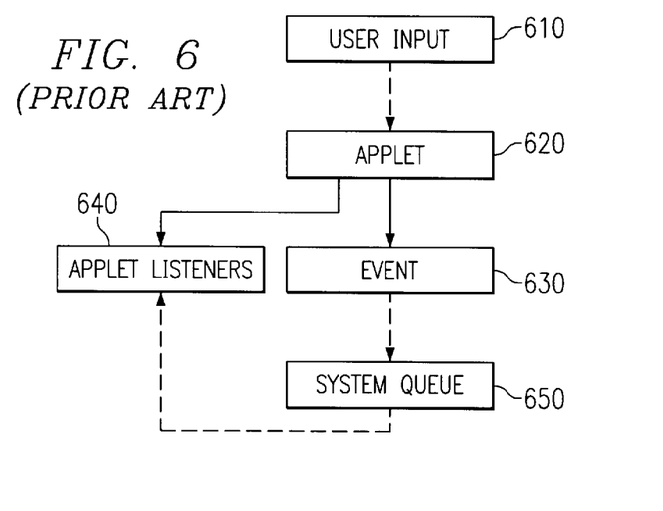
FIG. 6 is a block diagram illustrating how events are currently handled within Java applets.

Turning now to FIG. 6, there is shown a block diagram illustrating normal Java applet operation that runs on top of a JVM such as JVM 400 and may be implemented in a data processing system such as data processing system 300. An applet 620 must be loaded into an applet viewer, such as the applet viewers within Netscape Navigator or Microsoft Internet Explorer. Applet 620 contains all of the user-accessible components. Once applet 620 is loaded, it creates a standard Java class of event listeners (shown in FIG. 6 as applet listeners 640) that are attached to these components and system queue 650. It should be noted that several applet listeners may be (and usually will be) used.

Applet listeners 640 are event listeners. An event listener is any object that implements one or more listener interfaces. There are different listeners for each category of event in Java. For instance, the MouseListener interface defines methods such as MouseClicked, MousePressed, and MouseReleased. In order to receive events from a component, an object adds itself as a listener for that component's events. If an object implements the MouseListener interface, it listens for a component's mouse events by calling addMouseListener on that component. This allows a component's events to be handled without having to create a subclass of the component, and without handling the events in the parent container.

In response to user input 610 on a component in applet 620, such as moving a mouse, a keystroke, or a drag operation, an event 630 is constructed and posted on system queue 650. System queue 650 then dispatches this event to any applet listeners 640 on that component. The component's applet listeners 640 execute tasks according to the properties of event 630. Examples of tasks performed by applet listeners 640 include loading or saving information to a file when a button is depressed, playing a sound or displaying an image when the mouse cursor is moved over a specific area, and closing a program when a specific combination of keys is pressed.

Figure 7:
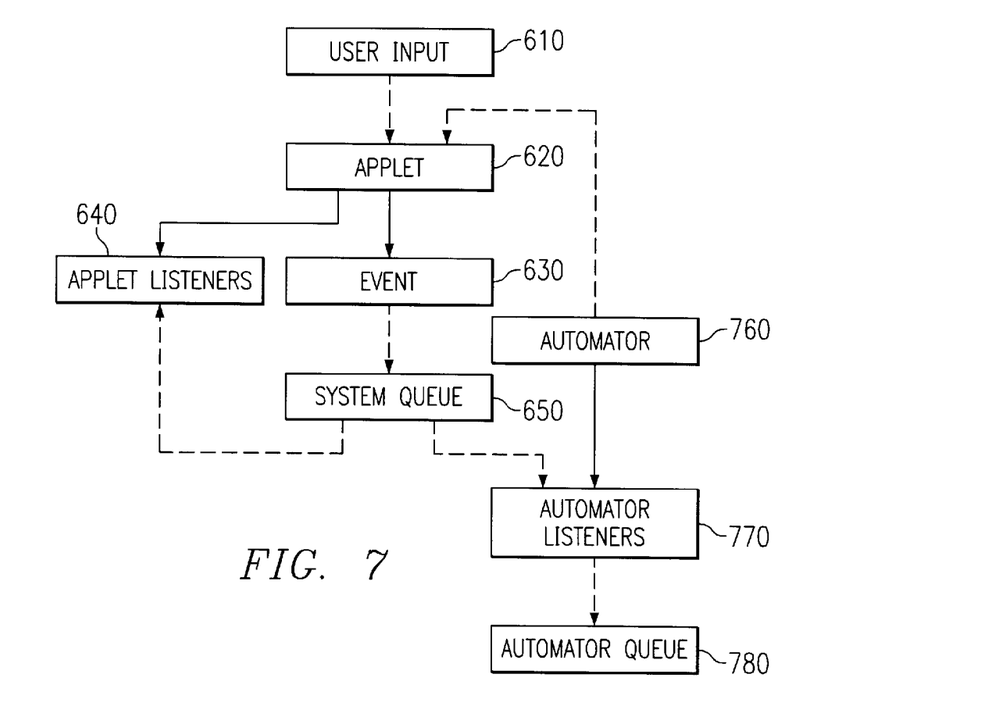
FIG. 7 is a block diagram illustrating how events are handled when an automator is attached to a Java applet.

Turning now to FIG. 7, there is a block diagram illustrating an applet recorder 700 in accordance with the present invention. Applet recorder 700 runs on top of a JVM, such as JVM 400, and may be implemented in a data processing system, such as data processing system 600. Applet recorder 700 consists of automator 760, which loads an applet 620 from a database located either on the local data processing system or on a network computer, such as server 104, for viewing. Automator 760 references applet 620 and adds automator listeners 770 to each of the applet 620 components. In response to user input 610 to a component of applet 620, an event 630 is constructed and posted on system queue 650, as is done with normal applet operation as discussed above.

However, system queue 650 not only dispatches event 630 to applet listeners 640, but also it dispatches event 630 to automator listeners 770 on that component. Automator listeners 770 receive an event 630 and store event 630 information to automator queue 780. When the recording session is complete, automator queue 780 contains all of the events that have occurred on applet 620 components. These events can then be played back by being posted to system queue 650 in the same order in which they were recorded.

Automator listeners 770 are similar to applet listeners 640, and are created by the automator and attached to each component of the applet 620. However, rather than perform a specified task to implement applet 620 as applet listeners 640 are programmed to do, automator listeners 770 capture events 630 and record them to automator queue 780, thereby recording the events such that they may be played back at a later time. By having these events stored, testing of a Java Virtual Machine, such as JVM 400, on a particular platform may be automated by having applet recorder 700 replay the user-generated events, thus freeing a person from this tedious task. These events may be required to be played back several times over a period of hours or days.

Figure 8:
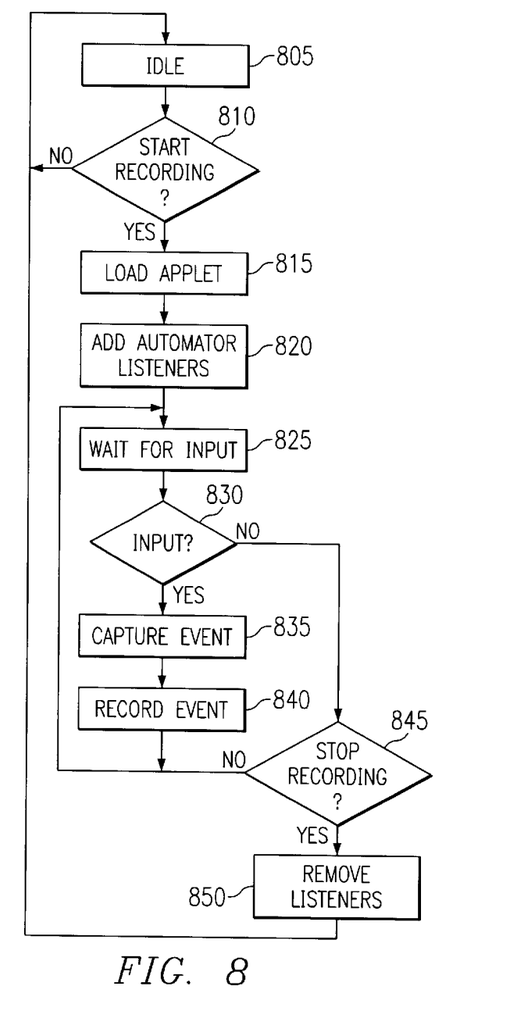
FIG. 8 is a flowchart illustrating how the applet recorder functions.

Turning now to FIG. 8, there is shown a flowchart illustrating a preferred method for recording events with applet recorder 700. After the applet recorder is started, it waits in idle mode (step 805) until it receives an indication from a user to start recording events 630 from an applet 620 (step 810). Once the indication to start recording is received from the user, an applet 620 is loaded into applet recorder 700 (step 815). The applet recorder then adds automator listeners 770 to each component of the applet (step 820), and then waits for user input (step 825).

If user input is received (step 830), then an event is constructed and posted to system queue 650. The system queue dispatches event 630 to automator listeners 770, which capture event 630 (step 835) and record event 630 to automator queue 780 (step 840) for later playback. Applet recorder 700 then continues to wait for user input (step 825).

If no user input is received (step 830), then the applet recorder determines if a stop recording command has been received from the user (step 845). If no stop recording command has been received (step 845), then applet recorder 700 continues to wait for user input (step 825). The recording of events generated by the user through applet 620 thus continues until a stop recording command is received (step 845). When a stop recording command is received, automator listeners 770 are removed, and applet recorder 700 ceases to record events generated by applet 620 (step 850). Applet recorder 700 then idles (step 805), waiting for a command to start recording anew (step 810).

Figure 9:
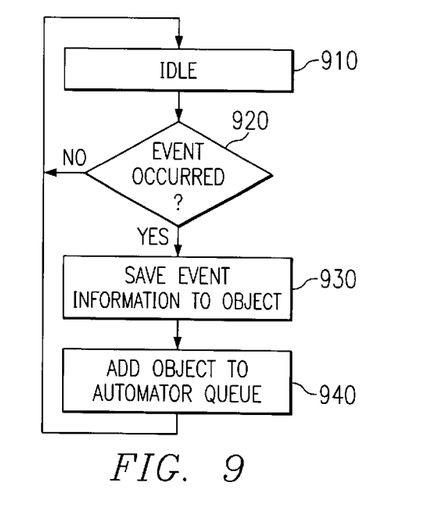
FIG. 9 is a flowchart illustrating the function performed by an automator listener.

With reference now to FIG. 9, there is shown a flowchart illustrating the function performed by an automator listener 770. Automator listener 770 idles (step 910) until an event occurs (step 920). Once an event, such as MOUSE_CLICKED, occurs, the event information is saved to an object (step 930). The object is then added to the automator queue 780 (step 940) and the automator listener continues to idle (step 910), waiting for the occurrence of another event (step 920).

Figure 10:
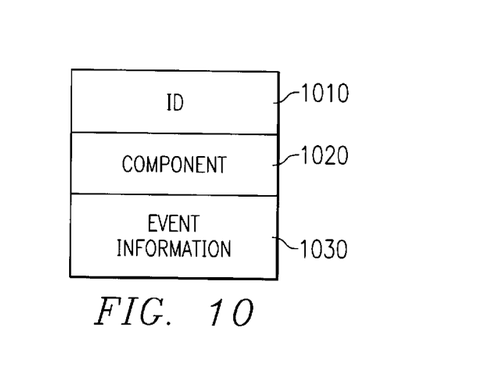
FIG. 10 is a block diagram illustrating the three main parts of an object created by an automator listener.

A block diagram illustrating the three main parts of an object created by an automator listener 770 is depicted in FIG. 10. The object consists of event ID 1010, component field 1020, and event information 1030. Event ID 1010 indicates the type of event that occurred, such as MOUSE_CLICKED, ITEM_STATE_CHANGED, etc. Component field 1020 references the component on which this event occurred, such as a button, list, text area, etc. Finally, each object contains specific event information 1030, which includes several event-specific things.

As an example of the functioning of an automator listener 770 and the creation of an object, suppose applet 620 button is clicked by a user. The automator listener 770 for that component would create an object with MOUSE_CLICKED as event ID 1010. A reference to the button component would be placed in component field 1020. Event information 1030 would contain all other information about the event, such as the x-y coordinate position, modifiers, click count (double or single click), etc.

It is important to note that, while the present invention has been described in terms of recording events generated by Java applets, it is also applicable to applications as well. Furthermore, while described principally with respect to Java, the present invention may be applied to other event-driven object oriented programming languages following a similar "listener interface" model.

It is also important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media, such floppy discs, hard disk drives, RAM, and CD-ROMs and transmission-type media, such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processor implemented method of recording events, the steps comprising:

loading an application;

adding listeners for each event type produced in the application;

capturing user generated events;

recording the user generated events to a data structure; and replaying the user generated events.

2. The method as recited in claim 1, wherein the application is a Java applet.

3. The method as recited in claim 1, further comprising waiting for a user to select a start recording option prior to the step of adding listeners.

4. The method as recited in claim 3, further comprising stopping the recording of the user generated events in response to user selection.

5. The method as recited in claim 1, wherein the application is located on a local database.

6. The method as recited in claim 1, wherein the application is located on a distributed database.

7. The method of claim 1, wherein replaying the user generated events includes recreating an operation of the application by applying the recorded user generated events to the application.

8. The method of claim 1, wherein the listeners are listeners that only capture and record the events to a queue without performing tasks to implement the application.

9. A computer program product in computer readable media for use in a data processing system for recording events, the computer program product comprising:

first instructions for loading an application;

second instructions for adding listeners for each event type produced in the application;

third instructions for capturing user generated events;

fourth instructions for recording the user generated events to a data structure; and fifth instructions for replaying the user generated events.

10. The computer program product as recited in claim 9, wherein the application is a Java applet.

11. The computer program product as recited in claim 9, further comprising sixth instructions for waiting for a user to select a start recording option prior to the step of adding listeners.

12. The computer program product as recited in claim 11, further comprising seventh instructions for stopping the recording of the user generated events in response to user selection.

13. The computer program product as recited in claim 9, wherein the application is located on a local database.

14. The computer program product as recited in claim 9, wherein the application is located on a distributed database.

15. The computer program product of claim 9, wherein the fifth instructions for replaying the user generated events include instructions for recreating an operation of the application by applying the recorded user generated events to the application.

16. The computer program product of claim 9, wherein the listeners are listeners that only capture and record the events to a queue without performing tasks to implement the application.

17. A system for recording events, comprising:
   means for loading an application;
   means for adding listeners for each event type produced in the application; and
   means for capturing user generated events;
   means for recording the user generated events to a data structure; and
   means for replaying the user generated events.

18. The system as recited in claim 17, wherein the application is a Java applet.

19. The system as recited in claim 17, further comprising means for waiting for a user to select a start recording option prior to the step of adding listeners.

20. The system as recited in claim 19, further comprising means for stopping the recording of the user generated events in response to user selection.

21. The system as recited in claim 17, wherein the application is located on a local database.

22. The system as recited in claim 17, wherein the application is located on a distributed database.

23. The system of claim 17, wherein the means for replaying the user generated events includes means for recreating an operation of the application by applying the recorded user generated events to the application.

24. The system of claim 17, wherein the listeners are listeners that only capture and record the events to a queue without performing tasks to implement the application.

25. A method of recording events, the steps comprising:
   loading an application;
   adding a listener for an event type;
   capturing an event;
   recording the event; and
   replaying the event.

26. The method as recited in claim 25, further comprising adding multiple listeners for multiple event types.

27. The method as recited in claim 25, wherein the application is a Java applet.

28. The method as recited in claim 25, further comprising creating a file for storing recorded events, wherein the contents of the file may be used for posting the recorded events to the applet at a later time.

29. The method of claim 25, wherein replaying the event includes recreating an operation of the application by applying the recorded event to the application.

30. The method of claim 25, wherein the listener is a listener that only captures and records the event to a queue without performing a task to implement the application.

31. A system for recording events generated by an application, comprising:
   an automator;
   a listener; and
   a file; wherein
   the automator is attached to an application and adds the listener to a component of an application; and
   the listener monitors events of the event type received from a system queue within the application and posts received events to the file.

* * * * *